US008544930B2

(12) United States Patent
Ravenscroft

(10) Patent No.: US 8,544,930 B2
(45) Date of Patent: Oct. 1, 2013

(54) TAILGATE DAMPING SYSTEMS

(75) Inventor: Colin Michael Ravenscroft, Saline, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 13/359,625

(22) Filed: Jan. 27, 2012

(65) Prior Publication Data

US 2013/0193709 A1 Aug. 1, 2013

(51) Int. Cl.
*B60P 1/26* (2006.01)

(52) U.S. Cl.
USPC .............................. 296/50; 296/57.1; 188/294

(58) Field of Classification Search
USPC ............... 296/56, 57.1, 146.8, 146.11, 146.1, 296/50; 49/386; 188/290, 294
See application file for complete search history.

(56) References Cited

U.S. PATENT DOCUMENTS

| | | | | |
|---|---|---|---|---|
| 6,154,924 | A * | 12/2000 | Woo | 16/62 |
| 6,854,781 | B2 | 2/2005 | Roach | |
| 7,314,241 | B2 | 1/2008 | Roach | |
| 7,690,711 | B2 | 4/2010 | McGowan et al. | |
| 7,695,043 | B2 * | 4/2010 | Zagoroff | 296/57.1 |
| 7,850,219 | B2 * | 12/2010 | Townson et al. | 296/50 |
| 8,020,918 | B2 | 9/2011 | Patzer et al. | |
| 2007/0152471 | A1 * | 7/2007 | Zagoroff | 296/146.4 |
| 2008/0066385 | A1 | 3/2008 | Roach | |
| 2008/0143139 | A1 * | 6/2008 | Bauer et al. | 296/146.1 |
| 2008/0197650 | A1 * | 8/2008 | Stratten et al. | 296/50 |
| 2008/0277960 | A1 * | 11/2008 | Zagoroff | 296/57.1 |
| 2008/0277964 | A1 * | 11/2008 | Kanno et al. | 296/146.1 |
| 2008/0284193 | A1 * | 11/2008 | Gleason et al. | 296/50 |
| 2008/0309118 | A1 * | 12/2008 | Kohlstrand | 296/146.1 |
| 2009/0096246 | A1 * | 4/2009 | Patzer et al. | 296/146.11 |
| 2009/0139057 | A1 * | 6/2009 | Honda et al. | 16/343 |
| 2009/0189406 | A1 * | 7/2009 | Gleason | 296/57.1 |
| 2010/0084885 | A1 * | 4/2010 | Townson et al. | 296/57.1 |
| 2010/0180399 | A1 * | 7/2010 | Patzer et al. | 16/54 |
| 2011/0215610 | A1 | 9/2011 | Zagoroff | |

* cited by examiner

*Primary Examiner* — Jason S Morrow
(74) *Attorney, Agent, or Firm* — Dinsmore & Shohl LLP

(57) ABSTRACT

A tailgate damping system for controlling movement of a tailgate assembly of a vehicle includes a speed sensor that provides rotational speed information of the tailgate assembly. A controller receives the rotational speed information from the speed sensor. A damping control assembly receives a tailgate shaft of the tailgate assembly. The damping control assembly includes a housing comprising a rotor chamber including a rotor member located therein. The rotor member is connected to a rotor shaft that is coupled to the tailgate shaft. A valve chamber includes a control valve located therein. The controller closes the control valve to inhibit exit of a damping fluid from the rotor chamber based on the speed information received from the speed sensor.

16 Claims, 6 Drawing Sheets

TAILGATE DAMPING SYSTEMS

TECHNICAL FIELD

The present specification generally relates to tailgate damping systems for lowering a tailgate of a truck in a controlled fashion.

BACKGROUND

Load carrying vehicles, such as trucks, often have fold-down tailgates. Folded down, the tailgates extend the area of the truck bed. Folded up, the tailgates close off the truck bed. It is known to provide tailgates with restraining devices for controlling lowering of the tailgates. As one example, cables may be provided to limit rotation of the tailgates thereby setting the open position of the tailgates at horizontal. The cables may be attached to the tailgates at one end and attached to sidewalls of the truck body at opposite ends. Such cable attachments, however, do not control the rate at which the tailgate falls to the open position.

SUMMARY

In one embodiment, a tailgate damping system for controlling movement of a tailgate assembly of a vehicle includes a speed sensor that provides rotational speed information of a tailgate shaft of the tailgate assembly. A controller receives the rotational speed information from the speed sensor. A damping control assembly receives the tailgate shaft. The damping control assembly includes a housing comprising a rotor chamber including a rotor member located therein. The rotor member is connected to a rotor shaft that is coupled to the tailgate shaft. A valve chamber includes a control valve located therein. The controller closes the control valve to inhibit exit of a damping fluid from the rotor chamber based on the speed information received from the speed sensor.

In another embodiment, a vehicle includes a tailgate assembly including a tailgate shaft that provides a pivot location for locating the tailgate assembly in an open configuration and a closed configuration. A tailgate damping system for controlling movement of the tailgate assembly. The tailgate damping system includes a speed sensor that provides rotational speed information of the tailgate shaft of the tailgate assembly. A controller receives the rotational speed information from the speed sensor. A damping control assembly receives the tailgate shaft. The damping control assembly includes a housing comprising a rotor chamber including a rotor member located therein. The rotor member is connected to a rotor shaft that is coupled to the tailgate shaft. A valve chamber includes a control valve located therein. The controller closes the control valve to inhibit exit of a damping fluid from the rotor chamber based on the speed information received from the speed sensor.

In another embodiment, a method of controlling operation of a tailgate assembly of a vehicle is provided. The method includes measuring speed of a falling tailgate assembly as the tailgate assembly moves from a closed configuration to an open configuration using a speed sensor. Speed information of the tailgate assembly from the speed sensor is provided to a controller. A fluid pressure level within a rotor chamber of a damping control assembly receiving a tailgate shaft of the tailgate assembly is increased. The damping control assembly includes a rotor chamber including a rotor member located therein. The rotor member is connected to a rotor shaft that is coupled to the tailgate shaft. A valve chamber is also provided by the housing including a control valve located therein. The controller closes the control valve to inhibit exit of a damping fluid from the rotor chamber based on the speed information received from the speed sensor.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to tailgate damping systems that control rotation of a tailgate assembly when lowering the tailgate assembly to an open configuration from a closed configuration. The tailgate damping system utilizes a damping control assembly including a rotor member that is operably connected to a tailgate shaft of the tailgate assembly. Rotation of the tailgate shaft is controlled by controlling rotation of the rotor member using a damping fluid.

Vehicle tailgate assemblies may include an inner wall and an outer wall made of sheet metal and/or plastic material. In the case of a pick-up truck with a drop-down tailgate, the tailgate assemblies may have an upright position or closed configuration in which the inner wall forms part of the enclosure of the pick-up bed where the inner wall and outer wall may enclose a tailgate space within the tailgate assembly. The tailgate assemblies may also have a drop down position or open configuration where the inner wall and the outer wall drop toward the ground to provide additional access to the pick-up bed.

Figure 1:
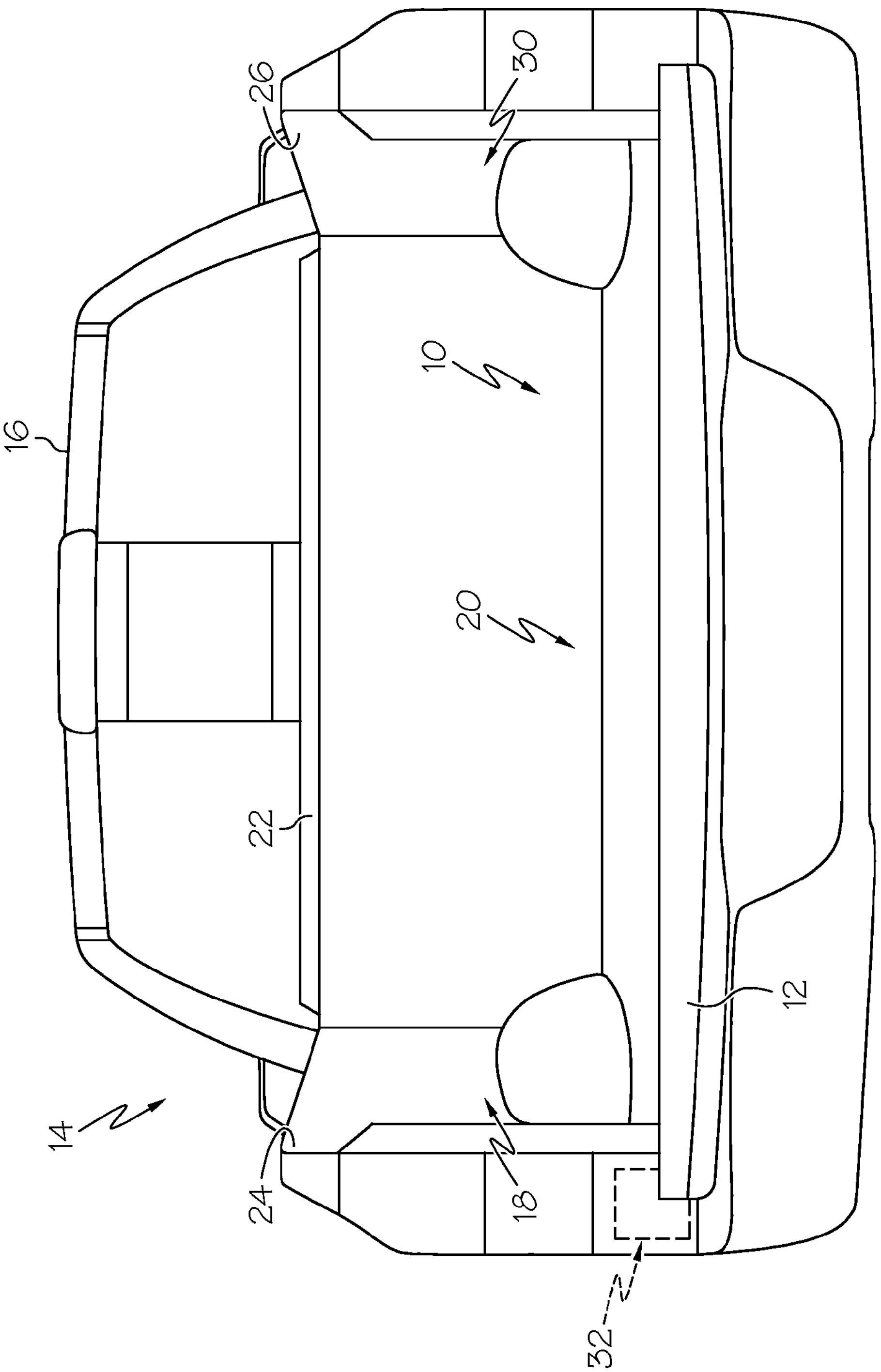
FIG. 1 is a rear view of a vehicle including a tailgate assembly and a tailgate damping system according to one or more embodiments described herein.

Referring to FIG. 1 an exemplary embodiment of a tailgate assembly 10 of a truck 14 is shown. The truck 14 generally includes a cab 16 at a front of the truck 14 and a pick-up bed 18 located at a rear of the truck 14. The cab 16 may be an enclosed space where the driver can sit. The pick-up bed 18 provides a volume 20 in which objects can be stored and transported. The pick-up bed 18 may be formed of a forward wall 22 and sidewalls 24 and 26 that extend rearward from the forward wall 22. The tailgate assembly 10 may be provided having the closed configuration, which closes off an access opening 30 between the sidewalls 24 and 26 at the rear of the truck 14 and the open configuration, where the tailgate assembly 10 is folded-down to provide access to the volume 20 through the access opening 30.

Figure 2:
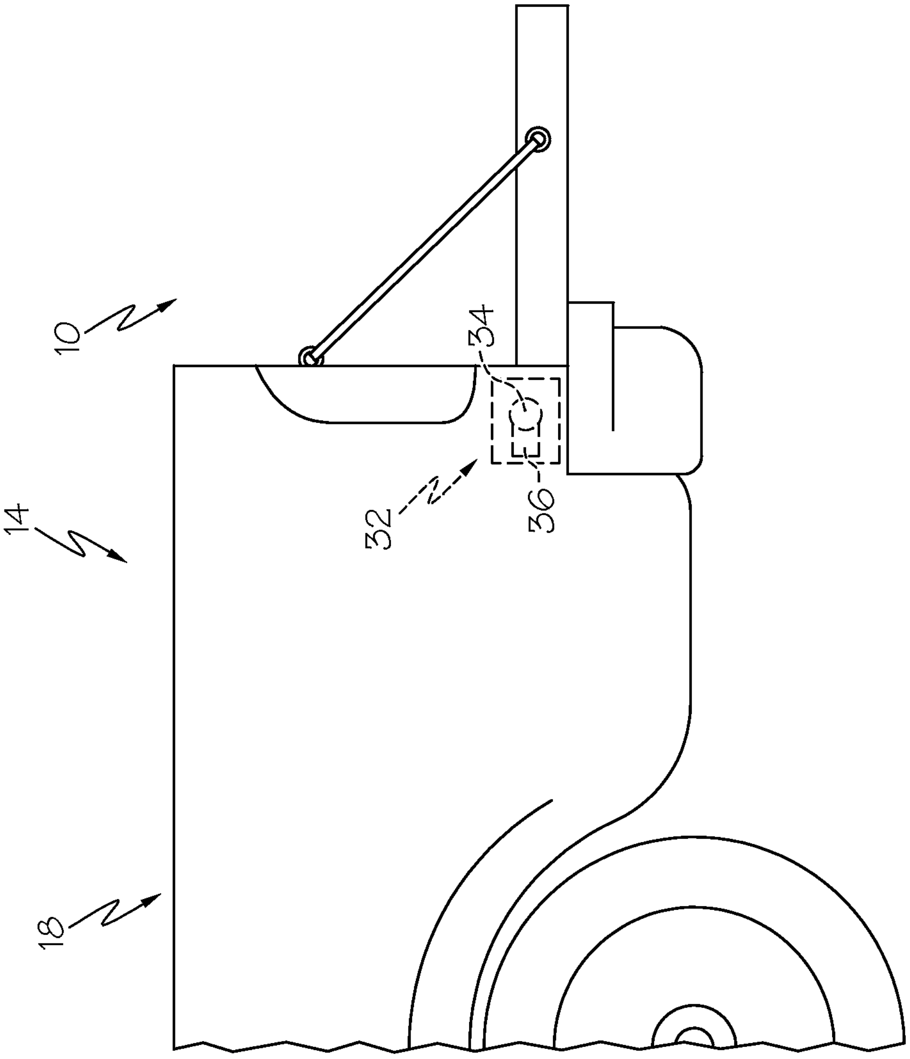
FIG. 2 is a side view of the vehicle of FIG. 1 including the tailgate assembly and a tailgate damping system.

Referring also to FIG. 2, a tailgate damping system 32 may be located in the sidewall 24 and/or 26 of the truck 14. The tailgate damping system 32 may be connected to a tailgate shaft 34 of the tailgate assembly 10 and may control rotation of the tailgate assembly 10 by controlling the rotation rate of the tailgate shaft 34. As will be described in greater detail below, the tailgate damping system 32 may also include a speed sensor 36 that is used to determine the rotational speed of the tailgate shaft 34 (or some other location on the tailgate assembly 10). If the determined speed is above a predetermined value, the tailgate dampening system 32 may slow rotation of the tailgate shaft 34 and the tailgate assembly 10 by pressurizing a damping fluid.

Figure 3:
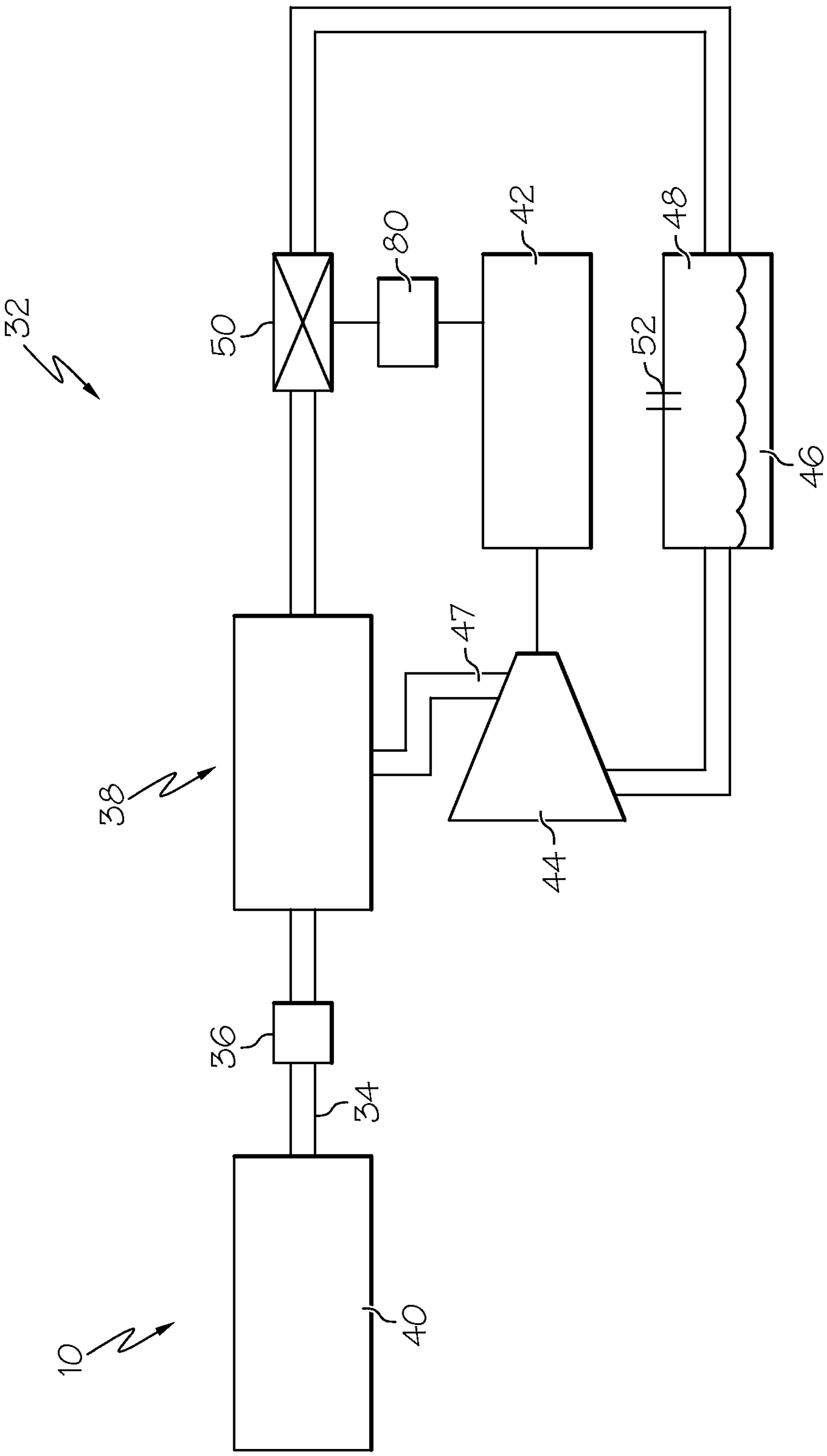
FIG. 3 is a schematic view of the tailgate assembly and a tailgate damping system of FIGS. 1 and 2.

Referring to FIG. 3, a schematic view of the tailgate assembly 10 and the tailgate damping system 32 is illustrated. The tailgate assembly 10 includes the tailgate shaft 34 that is connected to a damping control assembly 38. The speed sensor 36 (e.g., a potentiometer, optical sensor, etc.) measures the rotational speed of the tailgate shaft 34 between the tailgate 40 and the damping control assembly 38. A controller 42 may be provided that receives tailgate speed information from the speed sensor 36. The speed sensor 36 may be connected to the controller 42 by any suitable method (e.g., wired or wirelessly) for sending the tailgate speed information to the controller 42. Based on the tailgate speed information, the controller 42 controls operation of a pump 44 that pumps damping fluid 46 from a fluid reservoir 48 to the damping control assembly 38. In some embodiments, the pump 44 may be controlled based on one or more parameters other than the speed information. For example, the pump 44 may attempt to maintain a predetermined pressure or pressure range at the pump outlet 47. In another embodiment, the pump 44 may be used to charge an accumulator or other fluid charging device that provides pressurized damping fluid to the damping control assembly 38. In some embodiments, the controller 42 may activate the pump 44, which may operate at a predetermined speed (e.g., without any variable speed control from the controller 42).

A control valve 50 (e.g., a butterfly valve) is provided for controlling egress of the damping fluid from the damping control assembly 38. Operation of the control valve 50 may be controlled using the controller 42 based on, for example, the tailgate speed information from the speed sensor 36. Opening of the control valve 50 allows the damping fluid 46 to exit the damping control assembly 38, thereby decreasing the fluid pressure within the damping control assembly 38. Closing of the control valve 50 inhibits exit of the damping fluid 46 from the damping control assembly 38, thereby increasing or maintaining fluid pressure within the damping control assembly 38. Damping fluid 46 passing through the control valve 50 is delivered back to the fluid reservoir 48 for recycling through the tailgate damping system 32. The fluid reservoir 48 may include a vent 52 at atmospheric pressure that vents the fluid reservoir 48 to the atmosphere to provide a pressure differential between the pump outlet 46 and the fluid reservoir 48.

Figure 4:
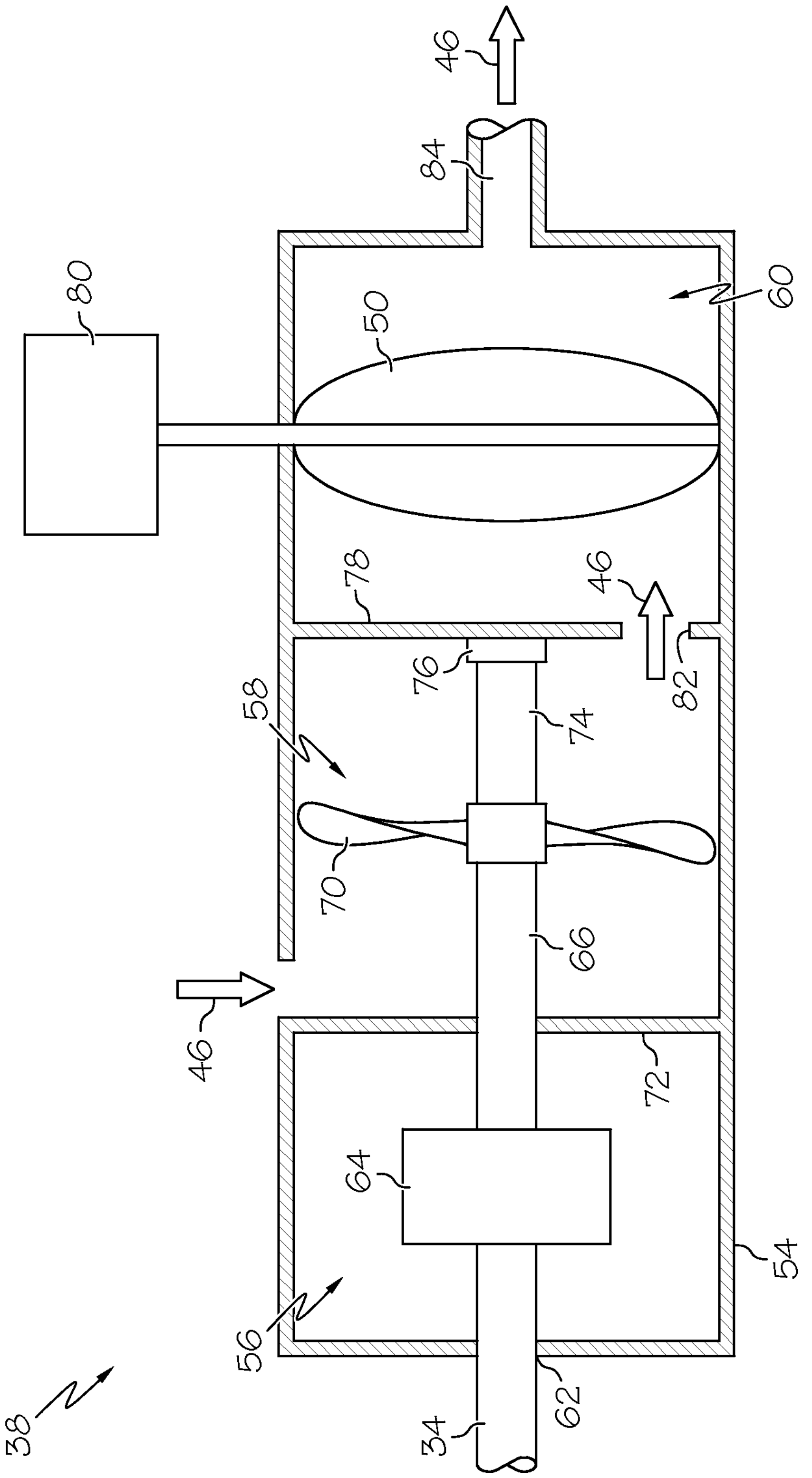
FIG. 4 is a schematic view of a damping control assembly of the tailgate damping system of FIG. 3 according to one or more embodiments described herein.

Referring to FIG. 4, the damping control assembly 38 is illustrated in isolation and includes a housing 54 that is divided into multiple chambers including a gear chamber 56, a rotor chamber 58 and a valve chamber 60. An opening 62 is provided through the housing 54 to allow the tailgate shaft 34 to enter the gear chamber 56. A gearbox 64 may be provided between the tailgate shaft 34 and a rotor shaft 66. The gearbox 64 may use gears and gear trains to provide speed and torque conversions from the tailgate shaft 34 to the rotor shaft 66. In some embodiments, the gearbox 64 may also include a clutch mechanism, such as a ratchet, which is used to couple the tailgate shaft 34 to the rotor shaft 66 when opening the tailgate assembly 10 and decouple the tailgate shaft 34 from the rotor shaft 66 when closing the tailgate assembly 10.

The rotor member 70 (e.g., an impeller) is connected to the rotor shaft 66 such that the rotor member 70 rotates therewith. The rotor shaft 66 extends from the gearbox 64, through a partition wall 72 that partitions the gear chamber 56 and the rotor chamber 58 and has an end 74 that is rotatably received by support structure 76 at a partition wall 78 that partitions the rotor chamber 58 and the valve chamber 60. The support structure 76 may include, for example, a rotary bearing or other structure that facilitates rotation of the rotor shaft 66 and the rotor member 70.

The control valve 50 is located in the valve chamber 60. In the illustrated example, the control valve 50 may be a butterfly valve, the operation of which is controlled by a motor 80 and the controller 42, for example, based on input from the speed sensor 36 (FIG. 3). A port or opening 82 is provided in the partition wall 78 that allows the damping fluid to travel from the rotor chamber 58 to the valve chamber 60. The control valve 50 is controlled to block, impede or partially block and allow the damping fluid to exit the tailgate damping system 32 through a fluid outlet 84, which controls fluid pressure within the rotor chamber 58. Damping fluid that exits the tailgate damping system 32 through the fluid outlet 84 may then be directed back to the fluid reservoir 48 (FIG. 3).

Figure 5:
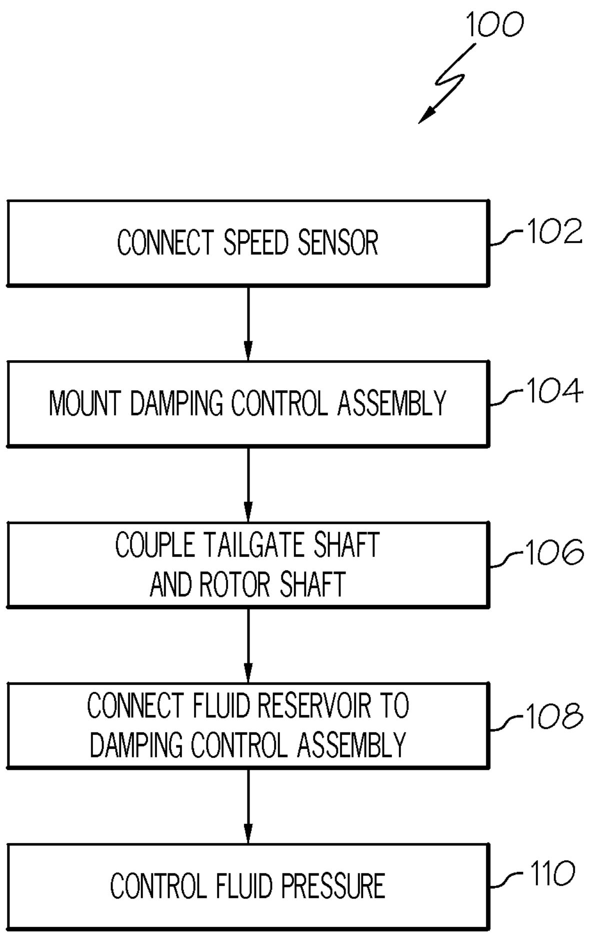
FIG. 5 illustrates a method of controlling operation of a tailgate assembly according to one or more embodiments described herein.

Referring to FIG. 5, a method 100 of controlling operation of a tailgate assembly includes, at step 102, connecting the speed sensor 36 to the tailgate assembly 10, for example, at the tailgate shaft 34. At step 104, the damping control assembly 38 may be mounted within the sidewall 24 of the pick-up bed 18 such that the damping control assembly 38 receives the tailgate shaft 34. At step 106, the tailgate shaft 34 is operatively coupled to the rotor shaft 66 that is, in turn, connected to the rotor member 70. The tailgate shaft 34 may be coupled to the rotor shaft 66 via the gearbox 64 that uses gears and gear trains to provide speed and torque conversions from the tailgate shaft 34 to the rotor shaft 66. In some embodiments, the gearbox 64 also includes a clutch mechanism, such as a ratchet, which is used to selectively couple the tailgate shaft 34 to the rotor shaft 66 when opening the tailgate assembly 10 and decouple the tailgate shaft 34 from the rotor shaft 66 when closing the tailgate assembly 10. At step 108, the fluid reservoir 48 is connected to the damping control assembly 38 for delivering damping fluid thereto using the pump 44. At step 110, the controller 42 may communicate with the pump 44 and/or the motor 80 for controlling fluid pressure within the rotor chamber 58 to increase or decrease resistance against rotational movement of the rotor member 70.

Figure 6:
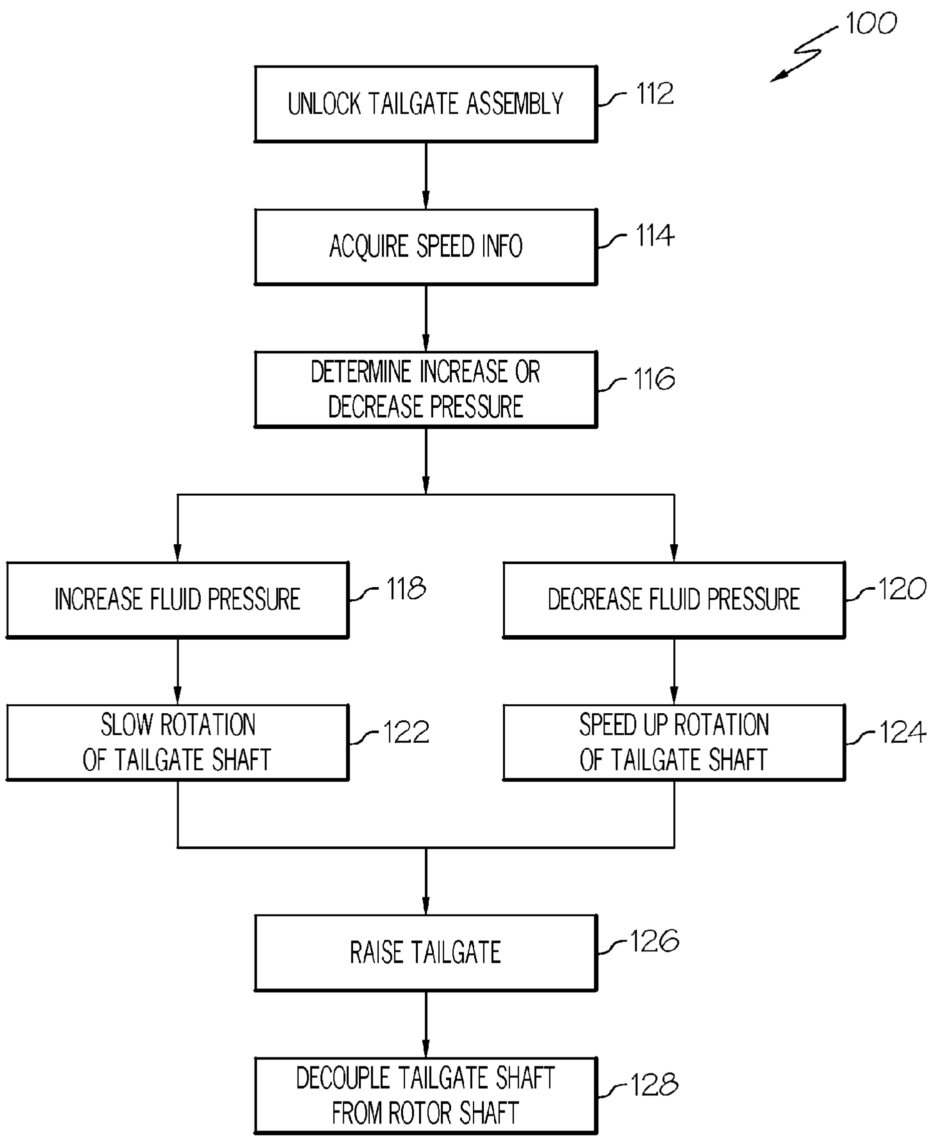
FIG. 6 illustrates a method of controlling operation of a tailgate assembly according to one or more embodiments described herein.

Referring to FIG. 6, the method 100 may include unlocking the tailgate assembly 10 at step 112 and allowing the tailgate assembly 10 to move toward its open or drop down configuration. As the tailgate assembly 10 falls, the speed information of the rotating tailgate shaft 34 is sent to the controller 42 from the speed sensor 36 at step 114. At step 116, based on this speed information, the controller 42 determines whether to increase or decrease (or maintain) a fluid pressure level within the rotor chamber 58 of the damping control assembly 38. For example, if the speed of the tailgate shaft 34 is about 35 degrees per second or more, such as about 40 degrees per second or more, such as about 50 degrees per second or more, such as about 60 degrees per second or more, the controller 42 may determine to increase the fluid pressure level within the rotor chamber 58. If the controller 42 determines to increase the fluid pressure within the rotor chamber 58 (e.g., the rotational speed of the tailgate shaft is above a predetermined value), the controller 42 may increase output of the pump 44 and/or close the control valve 50 using the motor 80 at step 118. If the controller 42 determines to decrease the fluid pressure within the rotor chamber 58 (e.g., the rotational speed of the tailgate shaft is below a predetermined value), the controller 42 may decrease output of the pump 44 and/or open the control valve 50 using the motor at step 120. Combinations of increasing and decreasing the output of the pump 44 and opening and closing the control valve 50 may be used to reach or maintain a particular fluid pressure in the rotor chamber 58. In some embodiments, the controller 42 may receive pressure information from a pressure sensor located in the rotor chamber 58.

At step 122, as fluid pressure increases within the rotor chamber 58 due to one or both of the pump output increasing and the control valve 50 closing, rotation of the rotor member 70 slows, which, in turn, slows rotation of the tailgate shaft 34 coupled therewith thereby slowing rotation of the tailgate assembly 10 toward the open configuration. Conversely, at step 124, as fluid pressure decreases within the rotor chamber 58 due to one or both of the pump output decreasing and the control valve 50 opening, rotation of the rotor member 70 increases, which, in turn, speeds up rotation of the tailgate shaft 34 coupled therewith thereby increasing the rotation speed of the tailgate assembly 10 toward the drop down configuration. At step 126, the tailgate assembly 10 may be moved from the drop down configuration toward the vertical closed configuration. At step 128, the gearbox 64 may include a clutch mechanism decoupling the tailgate shaft 34 from the rotor shaft 66 to allow the tailgate shaft 34 to rotate independently of the rotor shaft 66.

The above-described tailgate assemblies and tailgate damping systems provide for controlled movement of the tailgate assemblies as they are being opened. If the controller determines that the tailgate assembly is rotating too quickly toward the drop down or open configuration, the controller may increase the resistance on a rotor member coupled to the tailgate shaft to slow down rotation of the tailgate assembly. If the controller determines that the tailgate assembly is rotating too slowly toward the open configuration, the controller may decrease the resistance on the rotor member coupled to the tailgate shaft to speed up rotation of the tailgate assembly.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tailgate damping system for controlling movement of a tailgate assembly of a vehicle, the tailgate damping system comprising:

- a speed sensor that provides rotational speed information of the tailgate assembly;
- a controller that receives the rotational speed information from the speed sensor;
- a damping control assembly that receives a tailgate shaft of the tailgate assembly, the damping control assembly comprising a housing comprising:
  - a rotor chamber including a rotor member located therein, the rotor member connected to a rotor shaft that is coupled to the tailgate shaft; and
  - a valve chamber including a control valve located therein;
- a fluid reservoir that is in fluid communication with the damping control assembly for delivering a damping fluid to the damping control assembly; and
- a pump that pumps the damping fluid from the fluid reservoir to the damping control assembly;
- wherein the controller closes the control valve to inhibit exit of the damping fluid from the rotor chamber based on the speed information received from the speed sensor.

2. The tailgate damping system of claim 1 further comprising a motor that controls operation of the control valve, the motor being controlled by the controller based on the speed information.

3. The tailgate damping system of claim 1, wherein the fluid reservoir is vented to the atmosphere.

4. The tailgate damping system of claim 1, wherein the damping control assembly includes a gearbox coupling the rotor shaft to the tailgate shaft.

5. The tailgate damping system of claim 1, wherein the controller closes the control valve to inhibit exit of the damping fluid from the rotor chamber if the speed of the tailgate shaft is about 35 degrees per second or more.

6. A vehicle comprising:

- a tailgate assembly including a tailgate shaft that provides a pivot location for locating the tailgate assembly in an open configuration and a closed configuration; and
- a tailgate damping system for controlling movement of the tailgate assembly, the tailgate damping system comprising:
  - a speed sensor that provides rotational speed information of the tailgate assembly;
  - a controller that receives the rotational speed information from the speed sensor;
  - a damping control assembly that receives the tailgate shaft, the damping control assembly comprising a housing comprising:
    - a rotor chamber including a rotor member located therein, the rotor member connected to a rotor shaft that is coupled to the tailgate shaft; and
    - a valve chamber including a control valve located therein;
  - a fluid reservoir that is in fluid communication with the damping control assembly for delivering a damping fluid to the damping control assembly; and
  - a pump that pumps the damping fluid from the fluid reservoir to the damping control assembly;
- wherein the controller closes the control valve to inhibit exit of the damping fluid from the rotor chamber based on the speed information received from the speed sensor.

7. The vehicle of claim 6, wherein the tailgate damping system comprises a motor that controls operation of the control valve, the motor being controlled by the controller based on the speed information.

8. The vehicle of claim 6, wherein the fluid reservoir is vented to the atmosphere.

9. The vehicle of claim 6, wherein the damping control assembly includes a gearbox coupling the rotor shaft to the tailgate shaft.

10. The vehicle of claim 6, wherein the controller closes the control valve to inhibit exit of the damping fluid from the rotor chamber if the speed of the tailgate shaft is about 35 degrees per second or more.

11. A method of controlling operation of a tailgate assembly of a vehicle, the method comprising:

measuring speed of a falling tailgate assembly as the tailgate assembly moves from a closed configuration to an open configuration using a speed sensor;

providing speed information of the tailgate assembly from the speed sensor to a controller;

increasing a fluid pressure level within a rotor chamber of a damping control assembly receiving a tailgate shaft of the tailgate assembly, the damping control assembly comprising a rotor chamber including a rotor member located therein, the rotor member connected to a rotor shaft that is coupled to the tailgate shaft and a valve chamber including a control valve located therein; and the controller closing the control valve to inhibit exit of a damping fluid from the rotor chamber based on the speed information received from the speed sensor.

12. The method of claim 11 further comprising decreasing the fluid pressure level within the rotor chamber by opening the control valve.

13. The method of claim 12, wherein the controller opens the control valve based on the speed information received from the speed sensor.

14. The method of claim 13 further comprising directing the damping fluid to a fluid reservoir.

15. The method of claim 11 further comprising decoupling the tailgate shaft from the rotor shaft when the tailgate assembly is moved from the open configuration toward the closed configuration.

16. The method of claim 11, wherein the controller closes the control valve to inhibit exit of the damping fluid from the rotor chamber if the speed of the tailgate shaft is about 35 degrees per second or more.

* * * * *